United States Patent
Dangieri et al.

(10) Patent No.: US 6,387,160 B1
(45) Date of Patent: May 14, 2002

(54) ADSORBENT COMPOUND FOR USE IN INSULATED GLASS WINDOWS

(75) Inventors: Thomas J. Dangieri, Algonquin; Nanette Greenlay, Lisle, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/782,749

(22) Filed: Feb. 13, 2001

Related U.S. Application Data

(63) Continuation-in-part of application No. 09/290,599, filed on Apr. 13, 1999, now abandoned.

(51) Int. Cl.⁷ .................................................. B01D 53/02
(52) U.S. Cl. ........................................... 95/117; 95/141
(58) Field of Search ........................... 95/117, 130, 143, 95/141, 147; 423/235, 239.2, 245.1, DIG. 21; 52/172

(56) References Cited

U.S. PATENT DOCUMENTS

| | | | |
|---|---|---|---|
| 3,868,299 A | | 2/1975 | Ulisch et al. ................ 161/162 |
| 4,141,186 A | | 2/1979 | Schoofs ........................ 52/172 |
| 4,144,196 A | | 3/1979 | Schoofs .................. 252/455 Z |
| 4,151,690 A | | 5/1979 | Schoofs ........................ 52/172 |
| 4,476,169 A | | 10/1984 | Nishino et al. ............... 428/34 |
| 4,835,130 A | | 5/1989 | Box ............................ 502/62 |
| 5,300,138 A | | 4/1994 | Fischer et al. ................ 96/125 |
| 5,503,884 A | | 4/1996 | Meyer et al. ................. 428/34 |
| 5,773,380 A | * | 6/1998 | Pryor ........................... 52/172 |
| 5,856,264 A | * | 1/1999 | Cohen et al. ................ 502/414 |
| 5,962,358 A | | 10/1999 | Hees et al. .................... 502/67 |
| 6,020,280 A | * | 2/2000 | Pryor ........................... 502/62 |

FOREIGN PATENT DOCUMENTS

| | | | |
|---|---|---|---|
| DE | DD 205411 A | * | 12/1983 |
| WO | WO 96/37278 | | 11/1996 |
| WO | WO 96/37289 | | 11/1996 |

OTHER PUBLICATIONS

D.W. Breck, "Zeolite Molecular Sieves," 1974, John Wiley & Sons, Inc., New York (pp. 93–99).

* cited by examiner

*Primary Examiner*—Duane Smith
*Assistant Examiner*—Frank M. Lawrence
(74) *Attorney, Agent, or Firm*—John G. Tolomei; Frank S. Nolinaro; Mark Goldberg

(57) ABSTRACT

In using partially alkali metal exchanged forms of FAU zeolite as selective adsorbents for use in insulated glass windows, particularly for use in a matrix in insulated glass windows, it has been discovered that significant reduction in the nitrogen loading on the zeolite results when the alkali metal content is maintained at a low level. For example, such FAU zeolites, particularly zeolite X which has been ion-exchanged with potassium ions to a level of between about 5 and about 75 equivalent mole percent indicate a nitrogen adsorption loading of between about 400 and 600 percent lower than unexchanged zeolite X and about 200 percent less than fully potassium exchanged zeolite X. The adsorbent is particularly useful in a sealant matrix for insulated glass windows and may be used in combination with zeolite A to reduce out-gassing problems.

9 Claims, No Drawings

US 6,387,160 B1

ADSORBENT COMPOUND FOR USE IN INSULATED GLASS WINDOWS

CROSS-REFERENCE TO RELATED APPLICATION

This application is a Continuation-In-Part of application Ser. No. 09/290,599 filed Apr. 13, 1999, now abandoned, the contents of which are hereby incorporated by reference.

FIELD OF THE INVENTION

The present invention relates to improved insulated glass windows. The present invention also relates to a matrix incorporating the improved zeolite adsorbent compound. More particularly, the invention relates to the use of the improved zeolite adsorbent compound in insulated glass windows.

BACKGROUND OF THE INVENTION

Zeolites are well-known adsorbents which have been used in insulated glass windows between the glass panes, either alone or within a matrix. Generally, the zeolites are disposed along the periphery of the space enclosed by the glass panes, and the zeolites adsorb water vapor from the space between the panes to prevent the formation of a fog between the panes. The zeolite functions as a molecular sieve having pores into which the material being adsorbed passes. The pores in the molecular sieve have apertures of a size sufficient to permit the molecules of the material being adsorbed to pass-through, but small enough to block materials not adsorbed. Such molecular sieve zeolites for use in insulated glass windows are disclosed in U.S. Pat. Nos. 4,151,690, 4,141,186 and 4,144,196.

Zeolites are known to have pore sizes ranging between about 3 and about 10 angstroms. Insulating glass windows generally consist of two panes of glass separated by an air space. Generally, the zeolites are placed in a channel along the perimeter of the window pane, or incorporated in a matrix around the parameter. The matrix typically comprises a polymer well-known in the art and into which the activated zeolite is bound. Zeolites with pore sizes greater than about 3, are typically used to adsorb gaseous components in the air space. These gaseous components which can be adsorbed by such zeolites include oxygen and nitrogen, as well as water and organic vapors. When the temperature rises or the pressure lowers, the oxygen and nitrogen are released from the zeolite adsorbent. This phenomenon is known as out-gassing. When these zeolites are used in a matrix between the glass panes of a window, they adsorb oxygen and nitrogen when cooled (as during the evening hours) and then release the gases when the glass is heated (as during the daytime hours). This adsorption and desorption of gases can result in pressure variations in the enclosed air space between the glass panes. Such fluctuation can lead to window problems such as excessive deflection or inflection, or window failures from excessive flexing of the seal surrounding the window edges. Such out-gassing can also lead to a loss of adhesion between the glass panes and the matrix when the matrix is cured. The loss of adhesion generally results from the formation of bubbles in the matrix which then migrate to the adhesive-to-glass surface when such gases are released by the adsorbent.

In addition to the above gases in the enclosed air space between the glass panes, there are traces of the solvent from the matrix or inserts within the panes of the window. Over the life of the window, the matrix or other internal components in the window release solvent molecules which are larger than can be accommodated by the small pore adsorbents. In an effort to capture this solvent and keep it from forming a cloud, or a "chemical fog", and to prevent the chemical fog from condensing on the glass panes, a larger pore zeolite selective for the adsorption of the solvent molecules is included in the adsorbent material in the matrix or in the desiccant material.

U.S. Pat. Nos. 4,141,186 and 4,144,196 attempt to solve this problem by using zeolite adsorbents with pore sizes of about three angstroms or less in size so that oxygen and nitrogen molecules cannot enter into the pores, thus preventing the adsorption and desorption of these gases. In another patent, U.S. Pat. No. 4,151,690, it is disclosed that zeolite adsorbents with larger pore sizes can be pre-treated by adsorption of a low molecular weight polar material to partially suppress the undesirable adsorption of the gases.

U.S. Pat. No. 3,868,299 to Ulisch discloses the use of an adsorbent designed for use in multiple layer, or multi-layer, insulating glass windows comprising a small-pore zeolite in combination with a large-pore adsorbent and, optionally, a clay binder. Ulisch discloses that small-pore zeolites include sodium zeolite A, and large-pore adsorbents include faujasite, active carbon, silica gel, aluminum oxide and mixtures thereof. Kaolin, attapulgite, bentonite, waterglass, gellable silica sols and mixtures thereof are disclosed as suitable binders. Ulisch discloses that the adsorbent materials are prepared by methods known in the art as oil dropping, wherein a suspension of the adsorbent materials is stirred with an aqueous stable silica sol to form a free-flowing suspension which is subsequently introduced to a liquid immiscible with water to form droplets of the required size. The bead granulates formed are removed from the liquid as completely homogeneous bead granulates. The bead granulates are screened, dried, and dehydrated in hot air at about 350° C. Bead granulates produced in this manner represent the most common beads for use in insulating glass windows and, typically, have bulk densities ranging from about 0.640 gm/cc (40 lbs/ft$^3$) to about 0.960 gm/cc (60 lbs/ft$^3$) and range in size from about 10 to about 40 mesh.

Others such as U.S. Pat. No. 4,835,130 to Box, and hereby incorporated by reference, disclose the preparation of adsorbents for use in multi-pane windows by providing a zeolite material having a mixture of at least two zeolites having a pore size of 4 angstroms and a zeolite having a pore size up to and including 10 angstroms, which has been out-gassed by heating the zeolite to drive out gases and water vapor. The zeolite material is covered with a fluid such as a paraffinic, naphthenic, or aromatic oil which is impervious to nitrogen or oxygen and the covered zeolitic material is incorporated into a sealant matrix such as butyl, resin, zinc oxide, carbon black, aromatic resin, and silane.

U.S. Pat. No. 4,476,169 relates to an adsorbent material for multi-layer glazing wherein an adsorbent in the spacers consists of a granular zeolite having a core of synthetic zeolite with a clay binder wherein the core has more zeolite than the particle as a whole, and a shell of synthetic zeolite with a clay binder wherein the shell has more clay than in the particle as a whole, and of particles of activated carbon coated with synthetic latex.

Although combinations of small pore zeolite A and larger pore zeolites such as zeolite X have been used in insulated glass windows, the problem of out-gassing from the zeolite in the matrix which leads to the accelerated failure of the insulated glass window has not been resolved. Even though attempts have been made to maximize the amount of the small pore zeolite relative to the large pore zeolite, the problem of the large pore zeolite adsorbing air as well as solvent has not been resolved. When 13X zeolite is employed in the adsorbent mixture, the insulated window out-gassing problem often results.

It is an objective of the present invention to provide an adsorbent material for use in insulated glass windows which has a reduced capacity for adsorbing selected gases from air while retaining the capacity to prevent premature failure of insulated glass windows by release of solvent molecules.

It is an objective of the present invention to provide a large pore zeolite material which has a reduced affinity for the adsorption of air when used in insulated glass windows.

It is an objective of the present invention to mitigate the out-gassing problem in insulated glass windows by reducing the amount of nitrogen adsorbed by the adsorption material using an improved zeolitic adsorbent.

SUMMARY OF THE INVENTION

It was surprisingly discovered that the nitrogen adsorption capacity of a faujasite-type zeolite in insulated glass windows can be significantly reduced by low levels of ion-exchange of the FAU-type zeolite with an alkali metal without significantly reducing the adsorption of solvents. It was discovered that the nitrogen adsorption capacity of FAU zeolite, having a silica to alumina ratio of about 2.0 to about 2.5, and particularly an X zeolite can be significantly reduced by low levels of ion exchange with an alkali metal such as potassium, wherein low levels of ion-exchange means less than about 75 equivalent mole percent exchanged. More particularly, the nitrogen adsorption capacity of the X zeolite was significantly reduced by ion-exchange with potassium at potassium levels comprising from about 5 to about 40 equivalent mole percent potassium.

In one embodiment, the invention is a process for using an adsorbent compound for use in a matrix for the fabrication of insulated glass windows wherein the adsorbent compound comprises a zeolite A in combination with a FAU zeolite which has been partially ion-exchanged with a cation comprising an alkali metal, said faujasite having a framework silica-to-alumina ratio from 2.0 to 2.5 and containing from about 0.1 to about 75 equivalent mole percent of said cation.

In a further embodiment, the invention is a process for using an adsorbent in insulated glass windows for the adsorption of water and solvent vapor wherein the adsorbent comprises a FAU zeolite having a framework silica to alumina ratio of from about 2.0 to 2.5 and containing from about 5 to about 75 equivalent mole percent alkali metal cations selected from the group consisting of potassium, lithium, rubidium and cesium and having from 25 to about 95 mole percent sodium cations, the total cation equivalency contributed by the potassium and sodium being at least about 90 percent.

DETAILED DESCRIPTION OF THE INVENTION

The adsorbent or adsorbents employed in insulating glass windows can be any of the naturally occurring or synthetically produced adsorbents which will selectively, on the basis of molecular size, adsorb water without adsorbing oxygen or nitrogen. Typically, zeolite A, zeolite X, and mixtures thereof have been used in insulating glass windows to prevent condensation. More particularly, zeolites 3A, 4A, and 13X are preferred zeolite materials.

Zeolitic molecular sieves in the calcined form may be represented by the general formula;

$$Me_{2/n}O:Al_2O_3:xSiO_2$$

where Me is a cation, x has a value from about 2 to infinity, and n is the cation valence. Typical well-known zeolites which may be used include FAU-type zeolites such as faujasite, Zeolite X, and Zeolite Y. Detailed descriptions of some of the above identified zeolites may be found in D. W. Breck, *Zeolite Molecular Sieves,* John Wiley and Sons, New York, 1974, and are hereby incorporated by reference.

It is often desirable when using crystalline molecular sieves that the molecular sieve be agglomerated with a binder in order to ensure that the adsorbent will have suitable particle size and strength. There are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, clay binders such as attapulgite, kaolin, volclay, halloysite, sepiolite, palygorskite, kaolinite, bentonite, montmorillonite, illite, and mixtures thereof may be employed. Clay binders selected from the group consisting of attapulgite, kaolin, volclay, halloysite, and mixtures thereof are preferred. Attapulgite and halloysite are more preferred for use as a binder with the zeolite adsorbent material.

Agglomerate formation techniques employed for insulating glass windows have focused on producing a concentrated agglomerate which would meet the minimum standard set by the Insulating Glass Certification Council or other certifying agency and which pass the American Society of Testing Materials (ASTM) specifications E773 and E774 (herein incorporated by reference). The minimum standard was established that the amount of desiccant per linear foot of edge be greater than or equal to the amount used in prototype tests which were based on filling one to four sides of a hollow window spacer of fixed size and perimeter. Typically, the standard size spacer is about 0.63 cm (0.25 inch) wide by about 0.63 cm (0.25 inch) deep and the prototype window is about 35.6 cm (14 inches) by 50.8 cm (20 inches).

Type 3A molecular sieves admit and adsorb water molecules and exclude oxygen molecules and nitrogen molecules. Adsorbents for use in insulated glass windows to control condensation of water vapor and of hydrocarbons or organic sulfides on the interior surfaces of the panes are typically prepared by mixing Type 3A molecular sieve zeolite with either a silica gel adsorbent or a large pore molecular sieve. The alumina has a pore diameter sufficiently large enough to permit the adsorption of benzene molecules. Generally, the adsorbent mixtures contain a minimum of about 80 percent by mole of a Type 3A molecular sieve zeolite and a minimum about 20 weight percent silica gel. For some solvent systems, zeolite 13X is substituted for the silica gel.

In the present invention, it was surprisingly discovered that low-levels of ion-exchanging of the 13X zeolite component of the adsorbent mixture significantly reduced the tendency of the 13X zeolite to adsorb nitrogen, while not impacting the ability of the 13X zeolite to adsorb hydrocarbons. It was found that even at ion-exchange levels as low as about 5 mole percent with potassium, a significant reduction of the adsorption capacity for nitrogen occurred. Continuing to ion-exchange the 13X zeolite to levels up to at least about 40 equivalent mole percent of the available ion-exchange sites normally occupied by sodium continued to produce reductions in the nitrogen capacity. Preferably, the 13X zeolite is ion-exchanged to between from about 5 to about 40 equivalent mole percent potassium, and more preferably, the 13X zeolite is ion-exchanged to between from about 5 to about 25 equivalent mole percent potassium. Referring to a zeolite X structure, it is believed that this low level of alkali metal ion exchange replaces the sodium ions in the site III position of the supercage of the faujasite structure as described in Breck, ibid., pages 92–97 and herein incorporated by reference. When at least a portion of the site III sodium cations are replaced with alkali metal cations having a charge density less than that of sodium, the affinity for the adsorption of nitrogen is reduced. Preferably, the alkali metal is selected from the group consisting of potassium, rubidium, and cesium, and more preferably the alkali metal comprises potassium. Faujasite which has been ion-exchanged with organic cations such as ammonium and quaternary amines having similar low charge densities including ammonium, methyl amine, ethyl amine, and propyl amine as described in Table 7.7 on page 552 of Breck, ibid and hereby incorporated by reference, should also be suitable for the present invention. Nitrogen adsorption capacity tests confirmed significant reductions in the nitrogen adsorption capacity for 13X zeolite adsorbent following low-level potassium ion-exchange where the range of potassium ion-exchange ranged from about 5 to about 40 equivalent mole percent potassium. Preferably, the silica to alumina ratio of the FAU zeolite which is ion-exchanged with the alkali metal will range from about 2.0 to about 5.0. Preferably, the silica to alumina ratio of an alkali metal exchanged zeolite X will range from about 2.0 to about 2.5.

EXAMPLES

The present invention is illustrated and exemplified by the data shown in tabular form in Tables 1–4. The following adsorbent compositions, the methods for their preparation, and the testing procedures were used in obtaining the ion-exchanged 13X zeolites and the nitrogen and solvent adsorption capacity.

Example I

Samples of zeolite 13X with varying degrees of potassium ion-exchange were prepared according to a batch exchange procedure. Approximately 10 gram samples of 13X zeolite adsorbent in powder form were immersed in a potassium chloride solution at 80° to about 95° C. with constant agitation. Typically, this operation lasted from about 1 to about 2 hours. The potassium exchange level was controlled by the quantity of zeolite and the potassium chloride used. To prepare the 5, 10 and 15 mole percent exchanged zeolite samples, a stoichiometric quantity of aqueous 0.02 molar potassium chloride solution was used and the filtrate was analyzed for sodium content to verify the amount of residual sodium on the zeolite. A 25 mole percent exchanged 13X zeolite sample was prepared with an aqueous 0.1 molar solution of potassium chloride. A 75 mole percent exchanged 13X zeolite sample was prepared by a 3 stage exchange with an 0.5 molar solution of potassium chloride.

Table I presents the observed nitrogen loading of the adsorbent measured in a conventional McBain Bakkr apparatus for an increasing degree of potassium ion-exchanged 13X zeolite having a silica to alumina ratio of about 2.5. The adsorbent samples in the McBain Bakkr apparatus were activated in the conventional manner by raising the temperature to about 350° C. at vacuum conditions of less than about $10^{-4}$ torr (0.13 kPa). The nitrogen loading of the unexchanged 13X zeolite was about 0.969 weight percent. As the potassium ion exchange level was increased from about 0 to about 25 equivalent mole percent of the available ion exchange sites, the nitrogen loading, surprisingly decreased sharply from about 0.969 to about 0.172 weight percent. Thus, the partially ion-exchanged samples experienced about a 600 percent decrease in nitrogen capacity, compared to the unexchanged zeolite 13X. The nitrogen capacities were determined at room temperature (about 21° C.) and a pressure of about 2370 kPa (700 mm Hg). At ion-exchange levels above about 25 mole percent, nitrogen loading appeared to increase slightly as the ion exchange level of potassium approached about 40 to 50 mole percent potassium. The nitrogen loading on the ion-exchanged material remained fairly constant as the level of potassium exchange increased toward 100 percent. These data demonstrate that zeolite 13X with potassium exchange levels of lower than about 40 percent and above about 5 mole percent potassium exchange can significantly reduce the nitrogen loading of the adsorbent in insulated glass windows.

TABLE 1

Nitrogen Adsorption of Potassium Exchanged 13X Zeolite

| Zeolite Sample Type | Mol-% K-ion Exchange | Nitrogen Loading, wt-% |
| --- | --- | --- |
| 13X2.5 | 0 | 0.969 |
| NaKX2.5 | 8 | 0.440 |
| NaKX2.5 | 14 | 0.284 |
| NaKX2.5 | 21 | 0.242 |
| NaKX2.5 | 26 | 0.172 |
| NaKX2.5 | 75 | 0.509 |
| KX2.5 | 93 | 0.420 |

Example II

Samples of conventional materials were obtained and analyzed to determine how much air these materials adsorbed when cooled from about room temperature (about 23° C.) to about 0° C. and how much air these materials desorbed when heated from about 23° to about 60° C. Approximately 3 gram samples of each of the commercial samples were first permitted to reach equilibrium at room temperature (about 23° C.). The samples were placed in a 12 mm outside diameter by 75 mm long Pyrex glass test tube. The test tube was connected to a water manometer comprising two 25 cc burettes connected at their base and graduated with 0.1 cc graduations and filled with a sufficient amount of water so that the level reads about 12.5 cc. The test tube was placed in fluid communication with the top of one of the burettes by connecting the test tube with the burette with a length of plastic tubing. The difference between the initial manometer reading and the reading after the adsorbent had reached the desired temperature was determined. The test tube was heated or cooled to the desired temperature and the volume loss or gain at atmospheric pressure for each sample was measured. The following samples were tested: (a) 4A zeolite powder, (b) 3A zeolite powder, (c) silica gel particles, and (d) a mixed window desiccant bead comprising 80 weight percent 3A zeolite and 20 weight percent 13X zeolite. The adsorption and desorption out-gassing per gram of adsorbent is shown in Table 2. The 4A zeolite powder (a) exhibited the highest adsorption of air at about 2.0 cc/g and 3A zeolite (b) exhibited the least air adsorption at about 0.11 cc/g.

TABLE 2

Out-Gassing of Commercial Adsorbents

| Zeolite Sample Type | Air Adsorption, 0° C. | Air Desorption, 60° C. |
|---|---|---|
| a | 1.98 | 2.44 |
| b | 0.11 | 0.67 |
| c | 0.44 | 0.59 |
| d | 0.55 | 0.70 |

Example III

The procedure of Example II was repeated for 13X zeolite powder and potassium exchanged 13X zeolite at potassium exchange levels of 10, 25 and 75 mole percent potassium exchanged. The results shown in Table 3 indicate the same sharp drop in air, or nitrogen adsorption, noted in Example I for a 13X zeolite which was ion-exchanged with low levels of potassium. These results indicate that the ion-exchange of 13X zeolite can effectively reduce the adsorption of air (or out-gassing) at levels of potassium ion-exchange between about 5 and about 75 equivalent mole percent by a factor of about 200 percent over that of 13X zeolite which has not been ion-exchanged. The results of Example III using the above procedure appear to confirm the surprising reduction in nitrogen adsorption of Example I and extend the range of benefit for ion-exchange of a FAU zeolite or zeolite X up to about 75 equivalent mole percent with an alkali metal cation.

TABLE 3

Out-Gassing of Exchanged 13X Zeolite Adsorbents

| Zeolite Sample Type | Air Adsorption, 0° C. | Air Desorption, 60° C. |
|---|---|---|
| 13X | 4.0 | 4.39 |
| 5 mol-% K | 2.0 | 2.18 |
| 10 mol-% K | 2.01 | 2.21 |
| 25 mol-% K | 2.08 | 2.20 |
| 75 mol-% K | 2.11 | 2.39 |

Example IV

The ability of the potassium exchanged 13X zeolite to adsorb solvent was evaluated in the same manner as Example I. Samples of 13X zeolite and samples of 13X zeolite having been ion-exchanged with potassium at levels ranging from about 5 mole percent potassium to about 75 mole percent potassium were placed in a conventional McBain Bakkr apparatus. The adsorbent samples were activated in the McBain Bakkr apparatus in the conventional manner by raising the temperature to about 350° C. under vacuum conditions of about $10^{-4}$ torr (0.13 kPa). The samples were then exposed to toluene vapor at a pressure of about 7.6 torr (1.01 kPa). Table 4 presents the observed toluene loading of the adsorbent measured at ambient temperature for an increasing degree of potassium ion-exchanged 13X zeolite having a silica to alumina ratio of about 2.5. The toluene loading of the non-exchanged 13X zeolite was about 24.3 weight percent. The decrease in toluene adsorption capacity for a 5 mole percent potassium exchanged 13X compared to the non-exchanged 13X zeolite was less than about 2 percent, and the decrease in toluene capacity for a 25 mole percent potassium exchanged 13X zeolite compared to the non-exchanged 13X zeolite was only about 6.6 percent. Even at 75 percent potassium exchanged 13X zeolite, the decrease in toluene adsorption was only about 16.5 percent less than non-exchanged 13X zeolite.

TABLE 4

Toluene Adsorption of Potassium Exchanged 13X Zeolite

| Zeolite Sample Type | Mol-% K-ion Exchange | Toluene Loading, wt-% |
|---|---|---|
| 13X2.5 | 0 | 24.3 |
| NaKX2.5 | 5 | 23.9 |
| NaKX2.5 | 10 | 23.6 |
| NaKX2.5 | 25 | 22.7 |
| NaKX2.5 | 75 | 20.3 |

What is claimed is:

1. A process for adsorbing solvent in a matrix for the fabrication of insulated glass windows having an enclosed space comprising a solvent, said process comprising adsorbing the solvent with an adsorbent compound comprising a zeolite A in combination with a FAU zeolite which has been partially ion-exchanged with a cation comprising an alkali metal, said faujasite having a framework silica-to-alumina ratio from 2.0 to 2.5 and containing from about 0.1 to about 75 equivalent mole percent of said cation.

2. The process of claim 1 wherein the faujasite comprises a zeolite X having from about 0.1 to about 60 equivalent mole percent of available ion exchange sites exchanged with said alkali metal.

3. The process of claim 1 wherein the zeolite A is selected from the group consisting of a zeolite 3A, a zeolite 4A, a zeolite 5A molecular sieve and mixtures thereof.

4. The process of claim 1 wherein the alkali metal is selected from the group consisting of potassium, lithium, rubidium and cesium.

5. The process of claim 1 wherein the faujasite comprises from about 5 to about 40 equivalent mole percent ion-exchanged with potassium.

6. A process for the adsorption of water and solvent vapor in insulated glass windows, said process comprising adsorbing the water and solvent with an adsorbent comprising a FAU zeolite having a framework silica to alumina ratio of from about 2.0 to 2.5 containing from about 5 to about 75 equivalent mole percent alkali metal cations selected from the group consisting of potassium, lithium, rubidium and cesium and having from 25 to about 95 mole percent sodium cations, the total cation equivalency contributed by the alkali metal cations and sodium being at least about 90 percent.

7. The process of claim 6 wherein the faujasite comprises zeolite X.

8. The process of claim 6 wherein the faujasite comprises a zeolite 13X having from about 5 to about 40 equivalent mole percent potassium cations.

9. The process of claim 6 further characterized in that the faujasite comprises a zeolite 13X having from about 5 to about 25 equivalent mole percent potassium cations and from 75 to about 95 mole percent sodium cations, the total cation equivalency contributed by the potassium and sodium being at least about 90 percent.

* * * * *